United States Patent
Walters et al.

(10) Patent No.: US 11,254,838 B2
(45) Date of Patent: Feb. 22, 2022

(54) SINGLE COMPONENT HYDROPHOBIC COATING

(71) Applicant: PPG Industries Ohio, Inc., Cleveland, OH (US)

(72) Inventors: David N. Walters, Slippery Rock, PA (US); Emily S. Reinhardt, Allison Park, PA (US); Cynthia Kutchko, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 172 days.

(21) Appl. No.: 16/370,217

(22) Filed: Mar. 29, 2019

(65) Prior Publication Data
US 2020/0308442 A1    Oct. 1, 2020

(51) Int. Cl.
| | | |
|---|---|---|
| C09D 183/04 | (2006.01) | |
| C09D 133/08 | (2006.01) | |
| C09D 133/10 | (2006.01) | |
| C09D 175/04 | (2006.01) | |
| C08K 3/22 | (2006.01) | |
| C08K 3/36 | (2006.01) | |

(52) U.S. Cl.
CPC ......... *C09D 183/04* (2013.01); *C09D 133/08* (2013.01); *C09D 133/10* (2013.01); *C09D 175/04* (2013.01); *C08K 3/22* (2013.01); *C08K 3/36* (2013.01); *C08K 2003/2241* (2013.01)

(58) Field of Classification Search
None
See application file for complete search history.

(56) References Cited

U.S. PATENT DOCUMENTS

| | | | | |
|---|---|---|---|---|
| 4,064,566 A | * | 12/1977 | Fletcher | A61F 2/30767 |
| | | | | 128/898 |
| 5,340,866 A | * | 8/1994 | Evans | C08K 3/22 |
| | | | | 524/403 |
| 5,681,914 A | | 10/1997 | Kobayashi et al. | |
| 6,204,350 B1 | * | 3/2001 | Liu | C08L 101/10 |
| | | | | 427/195 |
| 7,074,856 B2 | * | 7/2006 | Ho | C09D 133/06 |
| | | | | 525/100 |
| 7,943,698 B2 | * | 5/2011 | Tomko | C09D 143/04 |
| | | | | 525/102 |
| 8,703,866 B2 | | 4/2014 | Iwasaki et al. | |
| 8,820,257 B2 | | 9/2014 | Chisholm et al. | |
| 9,139,753 B2 | | 9/2015 | Iezzi | |
| 9,221,942 B2 | | 12/2015 | Iezzi | |
| 9,365,742 B2 | | 6/2016 | Gervasi et al. | |
| 9,562,168 B2 | | 2/2017 | Jing et al. | |
| 9,701,868 B2 | | 7/2017 | Iezzi | |
| 2002/0010228 A1 | | 1/2002 | Simendinger, III | |
| 2004/0147188 A1 | * | 7/2004 | Johnson | D06M 15/576 |
| | | | | 442/93 |
| 2007/0167598 A1 | * | 7/2007 | Stanjek | C08G 18/10 |
| | | | | 528/25 |
| 2007/0215004 A1 | | 9/2007 | Kuroda et al. | |
| 2007/0275171 A1 | | 11/2007 | Dang et al. | |
| 2008/0090088 A1 | | 4/2008 | Deruelle et al. | |
| 2008/0304008 A1 | | 12/2008 | Muisener et al. | |
| 2009/0274915 A1 | | 11/2009 | Kirkpatrick et al. | |
| 2010/0126380 A1 | | 5/2010 | Itami et al. | |
| 2012/0283350 A1 | | 11/2012 | Saito et al. | |
| 2013/0004780 A1 | | 1/2013 | Hervieu et al. | |
| 2013/0023600 A1 | * | 1/2013 | Kobashigawa | A61K 6/891 |
| | | | | 523/116 |
| 2014/0147649 A1 | | 5/2014 | Su et al. | |
| 2014/0303284 A1 | * | 10/2014 | Chavan | C08L 83/04 |
| | | | | 523/435 |
| 2015/0009566 A1 | | 1/2015 | Iyer et al. | |
| 2018/0237643 A1 | * | 8/2018 | Nowak | C08G 18/10 |
| 2019/0225871 A1 | | 7/2019 | Southwell | |
| 2019/0307659 A1 | | 10/2019 | Zhu et al. | |
| 2020/0308442 A1 | * | 10/2020 | Walters | C09D 133/10 |

FOREIGN PATENT DOCUMENTS

| | | |
|---|---|---|
| CN | 101117525 A | 2/2008 |
| CN | 1813031 B | 6/2011 |
| CN | 102666759 B | 7/2015 |
| CN | 106398523 A | 2/2017 |
| CN | 106752255 A | 5/2017 |
| CN | 107075304 A | 8/2017 |
| CN | 107501561 A | 12/2017 |
| EP | 2021423 B1 | 11/2016 |
| JP | 11172200 A | 6/1999 |
| JP | 200253805 A | 2/2002 |

(Continued)

OTHER PUBLICATIONS

Aerosil R 972, Evonik, May 2019 (Year: 2019).*
Lee et al., "Preparation and characterization of surface modified silica nanoparticles with organo-silane compounds", Colloids and Surfaces A: Physicochem. Eng. Aspects, 2011, pp. 318-322, vol. 384.
Sepeur et al., "Nanotechnology: Technical Basics and Applications", 2008, Sections 3.3-3.4, pp. 31-51, Vincentz Network, Hannover, Germany.
Zhou et al., "Fabrication of ambient-curable superhydrophobic fluoropolysiloxane/TiO₂ nanocomposite coatings with good mechanical properties and durability", Progress in Organic Coatings, 2013, pp. 563-570, vol. 76.

(Continued)

*Primary Examiner* — Peter A Salamon
(74) *Attorney, Agent, or Firm* — Michael J. Grese

(57) ABSTRACT

A coating composition includes a polymer prepared from a mixture of reactants including (a) a fluorinated polysiloxane and (b) an alkoxy silane functional resin. The alkoxy silane functional resin includes a polyurethane resin or an acrylic resin. A substrate at least partially coated with the coating composition is also disclosed. A method of condensing a polar fluid by contacting a substrate at least partially coated with the coating composition with a polar fluid, such that the polar fluid condenses on at least a portion of the coated substrate is also disclosed.

19 Claims, No Drawings

(56) References Cited

FOREIGN PATENT DOCUMENTS

| | | |
|---|---|---|
| JP | 2008514744 A | 5/2008 |
| JP | 4711080 B2 | 6/2011 |
| JP | 2012506469 A | 3/2012 |
| JP | 2014112252 A1 | 7/2014 |
| JP | 2014162742 A | 9/2014 |
| JP | 2015128900 A | 7/2015 |
| JP | 2016166288 A | 9/2016 |
| KR | 1020040085484 A | 10/2004 |
| KR | 1020060026036 A | 3/2006 |
| KR | 100817734 B1 | 3/2008 |
| KR | 1020120120258 A | 11/2012 |
| KR | 1020120120259 A | 11/2012 |
| KR | 1020140031229 A | 3/2014 |
| KR | 1020140082845 A | 7/2014 |
| KR | 1020160010697 A | 1/2016 |
| KR | 1020160103070 A | 8/2016 |
| KR | 1020160105844 A | 9/2016 |
| WO | 2014136893 A1 | 9/2014 |
| WO | 2015102979 A1 | 7/2015 |
| WO | 2017113269 A1 | 7/2017 |

OTHER PUBLICATIONS

Accession No. 1997-2488, CAPLUS ACS, 2021, pp. 2-3.
Accession No. 2014-1970049, CAPLUS ACS, 2021, pp. 2-4.
Graffius et al. "Covalent Functionalization of Silica Surface Using "Inert" Poly(dimethylsiloxanes)", American Chemical Society, Langmuir, 2014, 14797-14807, vol. 30.
Manoudis et al., "Superhydrophobic Composite Films Produced on Various Substrates", Langmuir, 2008, pp. 11225-11232, vol. 24, No. 19.

* cited by examiner

SINGLE COMPONENT HYDROPHOBIC COATING

STATEMENT REGARDING FEDERALLY SPONSORED RESEARCH

This invention was made with government support under Collaboration Agreement No. 201667-140842 with the National Center for Manufacturing Sciences. The United States government may have certain rights in this invention.

FIELD OF THE INVENTION

The present invention relates to a coating composition, substrates coated with the coating composition, and methods of condensing a polar fluid by contacting a substrate at least partially coated with the coating composition with said polar fluid.

BACKGROUND OF THE INVENTION

Coating compositions applied on substrates and cured to form a coating are used in various industries to facilitate the condensation of water, or other polar fluids, on the coating from the surrounding air. Examples include coating compositions used on air wells or on heating, ventilation, and air conditioning (HVAC) systems (e.g., condenser tubes thereof). Efficiency of heat exchangers can be improved by the rapid condensation of the water from the air in the area of these coatings, followed by rapid removal of the water droplet from the coated surface via gravity and/or forced air flows over the heat exchanger surface. Accordingly, coating surfaces which provide high water contact angles and low values for hysteresis are desirable to promote more efficient and cost effective operation of heat exchangers.

SUMMARY OF THE INVENTION

The present invention is directed to a coating composition comprising a polymer prepared from a mixture of reactants including (a) a fluorinated polysiloxane and (b) an alkoxy silane functional resin. The alkoxy silane functional resin includes a polyurethane resin or an acrylic resin.

The present invention is also directed to a method of condensing a polar fluid including: contacting a substrate at least partially coated with a coating composition with a polar fluid, such that the polar fluid condenses on at least a portion of the coated substrate. The coating composition includes a polymer prepared from a mixture of reactants including (a) a fluorinated polysiloxane and (b) an alkoxy silane functional resin. The alkoxy silane functional resin includes a polyurethane resin or an acrylic resin.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" alkoxy silane functional resin, "a" fluorinated polysiloxane, and the like refer to one or more of these items. Also, as used herein, the term "polymer" is meant to refer to prepolymers, oligomers, and both homopolymers and copolymers. The term "resin" is used interchangeably with "polymer."

As used herein, the transitional term "comprising" (and other comparable terms, e.g., "containing" and "including") is "open-ended" and is open to the inclusion of unspecified matter. Although described in terms of "comprising", the terms "consisting essentially of" and "consisting of" are also within the scope of the invention.

The present invention may be directed to a coating composition comprising a polymer prepared from a mixture of reactants including (a) a fluorinated polysiloxane and (b) an alkoxy silane functional resin, wherein the alkoxy silane functional resin may include a polyurethane resin or an acrylic resin. A coating composition may refer to a coating composition that condenses water (or other polar fluid) from the surroundings and onto a substrate when the coating composition is applied to a substrate and cured. A coating composition, when applied to the substrate and cured, may contribute to the coated substrate exhibiting other advantageous properties, such as easy-to-clean, self-cleaning, anti-fouling, and/or anti-fogging (e.g., promoting condensation of water in the form of a film rather than in the form of small droplets) properties.

The polymer may be prepared from a mixture comprising a fluorinated polysiloxane. As used herein, the term "polysiloxane" refers to a polymer with a backbone or main chain that contains one or more Si—O—Si linkages. The polysiloxane may include a single polysiloxane or a mixture of polysiloxanes. The polysiloxane may have the general structure of Formula I below:

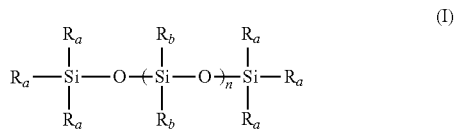

In Formula I, n may range from at least 1 to a maximum of 1,000, or 1 to 100, and each $R_a$ and $R_b$ independently represents a group selected from hydrogen, a hydroxyl group, a substituted or unsubstituted hydrocarbon group, and mixtures thereof. Each individual $R_a$ group may be the same or different than other $R_a$ groups and each individual $R_b$ group may be the same or different than other $R_b$ groups. A fluorinated polysiloxane may have the general structure of Formula I wherein at least one $R_b$ group contains a fluorinated group. $R_b$ may be an alkyl chain of one or more carbons wherein one or more fluorine groups is attached to one or more of the carbons in the alkyl chain. The fluorine groups may be attached to the terminal carbon or the other carbons along the alkyl chain. Suitable fluorinated polysiloxanes include, but are not limited to, polytrifluoropropylmethylsiloxane such as the polymer shown in Formula II. The fluorinated polysiloxane may be silanol terminated.

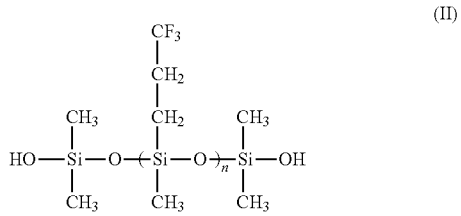

(II)

The polymer component (a) may include at least two polysiloxanes, a first fluorinated polysiloxane and a second polysiloxane, which are different from one another. The fluorinated polysiloxane may be present in the coating composition in an amount of 5 weight percent or greater, such as 10 weight percent or greater, 20 weight percent or greater, 30 weight percent or greater, 40 weight percent or greater, or 50 weight percent or greater, based on total solids weight of the coating composition. The fluorinated polysiloxane may be present in the coating composition in an amount of 80 weight percent or less, such as 75 weight percent or less, based on total solids weight of the coating composition. The fluorinated polysiloxane may be present in the coating composition in an amount of 5-80 weight percent, 10-75 weight percent, 20-75 weight percent, 30-75 weight percent, 40-75 weight percent, 50-80 weight percent, or 50-75 weight percent, based on total solids weight of the coating composition. The fluorinated polysiloxane may impart hydrophobicity (by virtue of a hydrophobic portion present in the polymer) to a cured coating prepared including the fluorinated polysiloxane in the coating composition. The hydrophobic portion is defined as portion of the coating composition that exhibits a water contact angle (WCA) of at least 900 using Kruss Drop Shape Analysis. As reported herein, Kruss Drop Shape Analysis was performed on a Kruss Drop Shape Analyzer (DSA 100) according to ASTM test method D7334.

The polymer may be prepared from a mixture comprising an alkoxy silane functional resin. An alkoxy silane functional resin includes at least one pendant and/or terminal alkoxy silane group. A "pendant group", also referred to as a "side chain", is an offshoot from the polymer main chain and is not part of the main chain, and a "terminal group" refers to a functional group positioned at the end of the polymer main chain. The term "silane" refers to a compound derived from $SiH_4$ by substituting organic groups for one or more of the hydrogen atoms, and the term "alkoxy" refers to an —O-alkyl group. Further, an "alkoxy silane" refers to a silane compound with at least one alkoxy group bonded to a silicon atom. The alkoxy silane can also comprise multiple alkoxy groups bonded to the silicon atom. The alkoxy silane can comprise two alkoxy groups, or three alkoxy groups, bonded to the silicon atom. As such, the alkoxy silane can have one, two, or three alkoxy groups. The alkoxy groups that can be bonded to the silicon atom include, but are not limited to, alkoxy groups with a $C_1$ to $C_{20}$ carbon chain, a $C_1$ to $C_{10}$ carbon chain, a $C_1$ to $C_6$ carbon chain, or a $C_1$ to $C_4$ carbon chain. Suitable alkoxy groups include methoxy, ethoxy, propoxy, isopropoxy, butoxy, sec-butoxy, isobutoxy, t-butoxy, pentoxy, isopentoxy, and combinations thereof.

An alkoxy silane functional resin can comprise a particular polymer architecture, such as a linear polymer comprising pendant and/or terminal alkoxy silane groups. The alkoxy silane functional resin may be a branched polymer comprising pendant and/or terminal alkoxy silane groups. The alkoxy silane functional resin may contain a total of at least 2 alkoxy groups bonded to silicon atoms, such as at least 3, at least 4, at least 6 or at least 9 alkoxy groups bonded to silicon atoms.

The alkoxy silane functional resin may include a polyurethane resin. As used herein, the term "polyurethane resin" refers to a polymer comprising at least one urethane linkage. The polyurethane resin can be formed according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may react with an isocyanate group to form a urethane linkage. A primary or secondary amine group may react with an isocyanate group to form a urea linkage. Generally the reaction mixture includes at least one hydroxyl-functional reactive compound such as a polyol for formation of urethane functionality. Typically the compound(s) having functional groups that are reactive with the isocyanate functionality of the polyisocyanate comprise at least one compound having two or more active hydrogen-containing functional groups, e.g. selected from those mentioned above, per molecule.

Suitable reactive compounds include polyols, polyisocyanates, compounds containing carboxylic acid groups including diols containing carboxylic acid groups, polyamines, polythiols, and/or other compounds having reactive functional groups, such as hydroxyl groups, thiol groups, amine groups, and carboxylic acids. The reactive compounds may comprise an alkoxysilane group to impart alkoxy silane functionality to the polyurethane resin.

An isocyanate-functional polyurethane prepolymer may be formed by reacting a stoichiometric excess of polyisocyanate with one or more reactive compounds as described above, such as a polyol. The isocyanate-functional polyurethane prepolymer may be reacted with an additional reactive compound which comprises an alkoxy silane to yield an alkoxy silane functional polyurethane. The additional reactive compound may be an alkoxy silane functional primary or secondary amine, which reacts with the polyurethane prepolymer to form a urea linkage. The alkoxy silane functional reactive compound may comprise terminal alkoxy silane groups to yield a polyurethane with terminal alkoxy silane groups.

The alkoxy silane functional resin may include an acrylic resin. As used herein, the term "acrylic resin" refers to a polymer formed from at least one acrylic monomer. The acrylic resin may be formed according to any method known in the art by using any number of acrylic monomers, including alkyl (meth)acrylates such as ethyl (meth)acrylate, methyl (methacrylate), and butyl (meth)acrylate, functional acrylates such as hydroxyethyl (meth)acrylate, cyclic and polycyclic (meth)acrylics such as benzyl (meth)acrylate, cyclohexyl (meth)acrylate, and isobornyl (meth)acrylate, and acrylamides such as N-butoxy methyl acrylamide. The acrylic monomer may be an alkoxy silane functional acrylic monomer. An acid functional (meth)acrylic acid and an alkyl (meth)acrylate may each be used. Mixtures of (meth)acrylic resins can also be used. It will be understood that (meth)acrylic and like terms refers to both methacrylic and acrylic.

An alkoxy silane functional acrylic resin may be a polymer formed from at least one alkoxy silane functional acrylic monomer. An alkoxy silane functional acrylic resin may be a polymer formed from at least one isocyanate functional acrylic monomer and/or epoxy functional acrylic monomer, which is further reacted to form the alkoxy silane functional acrylic resin. An isocyanate functional acrylic residue may be reacted with an alkoxy silane functional compound having a functional group that is reactive with the isocyanate functionality, such as an alkoxy silane functional amine. An epoxy functional acrylic residue may be reacted with an alkoxy silane functional compound having a functional group that is reactive with the epoxy functionality, such as an alkoxy silane functional amine or an alkoxy silane functional thiol. An alkoxy silane functional acrylic resin may be a polymer formed from a hydroxyl functional acrylic resin that is reacted with an alkoxy silane functional compound having a functional group that is reactive with the hydroxyl functionality, such as an alkoxy silane functional isocyanate.

The polymer may also include (c) a metal alkoxide. By "alkoxide" it is meant the conjugate base of an alcohol (Y—OH) where Y may be a $C_1$-$C_{10}$ linear or branched alkyl group. The metal alkoxide may include a polyvalent metal. Suitable metal alkoxides include zirconium alkoxide (such as zirconium butoxide or zirconium methoxide), titanium alkoxide, tantalum alkoxide, hafnium alkoxide, aluminum alkoxide, zirconium isoproproxide isopropanol, or mixtures thereof. The metal alkoxide may be present in the coating composition in an amount of at least 0.5 weight percent, at least 1 weight percent, or at least 2 weight percent, based on total solids weight of the coating composition. The metal alkoxide may be present in the coating composition in an amount of less than 20 weight percent, such as less than 15 weight percent, less than 10 weight percent, or less than 5 weight percent, based on total solids weight of the coating composition. The metal alkoxide may be present in the coating composition in an amount of 0.5-20 weight percent, such as, 0.5-5 weight percent, 0.5-10 weight percent, 0.5-15 weight percent, 1-20 weight percent, 1-10 weight percent, 1-5 weight percent, 2-20 weight percent, 2-10 weight percent, or 2-5 weight percent, based on total solids weight of the coating composition.

The polymer may also include a hydrophobic and/or a hydrophilic additive. A "hydrophobic additive", as used herein, is an additive that increases the water contact angle of the cured coating composition. A "hydrophilic additive", as used herein, is an additive that decreases the water contact angle of the cured coating composition. The additive may be a hydrophilic additive, which may not be a reactant that forms the polymer. The hydrophilic additive may be added after the polymer, as previously described, is prepared. The hydrophilic additive may impart hydrophilicity (create a hydrophilic portion) to a cured coating prepared including the hydrophilic additive in the coating composition. The hydrophilic portion is defined as a portion of the coating composition that exhibits a WCA of less than 90° using the Kruss Drop Shape Analysis. Suitable hydrophilic additives include nano-sized particles of titanium dioxide ($TiO_2$), aminopropylsilane treated silica, untreated silica, and/or mixtures thereof. By "nano-sized" it is meant that the particles of $TiO_2$ have a mean particle size of no more than 100 nanometers, according to ASTM F1877-16.

The hydrophilic additive may be present in the coating composition in an amount of at least 1 weight percent, at least 10 weight percent, at least 15 weight percent, at least 20 weight percent, or at least 25 weight percent, based on total solids weight of the coating composition. The hydrophilic additive may be present in the coating composition in an amount less than 50 weight percent, less than 40 weight percent, or less than 35 weight percent based on total solids weight of the coating composition. The hydrophilic additive may be present in the coating composition in an amount of 10-50 weight percent, 15-40 weight percent, 20-35 weight percent, or 25-35 weight percent, based on total solids weight of the coating composition. An effective amount of the hydrophilic additive may be added to the coating composition such that, when applied to the substrate and cured, the overall coating is hydrophobic. A hydrophilic coating is defined as the overall cured coating demonstrating a WCA of less than 90° using Kruss Drop Shape Analysis. A hydrophobic coating is defined as the overall cured coating demonstrating a WCA of at least 900 using Kruss Drop Shape Analysis. A superhydrophobic coating is defined as the overall cured coating demonstrating a WCA of at least 150° using Kruss Drop Shape Analysis. As used herein, the term "overall coating" refers to the coating when considered as a whole, as opposed to the characteristics of any one portion of the coating. An effective amount of the hydrophilic additive may be added to the coating composition such that, when applied to the substrate and cured, the overall cured coating exhibits a WCA of at least 100°, at least 110°, at least 120°, at least 130°, at least 140°, or at least 150°. An effective amount of the hydrophilic additive may be added to the coating composition such that, when applied to the substrate and cured, the overall coating is superhydrophobic. An effective amount of the hydrophilic additive may be added to the coating composition such that, when applied to the substrate and cured, the overall cured coating exhibits a WCA of at least 150° and a hysteresis of no more than 25° or no more than 10°. As used herein, hysteresis is defined as a difference of the advancing contact angle and the receding contact angle of a drop of liquid (such as water) on a plane angled between 0° and 90° relative to the horizontal. Hysteresis may be measured using Kruss Drop Shape Analysis.

The additive may be a hydrophobic additive, which may not be a reactant that forms the polymer. The hydrophobic additive may be added after the polymer, as previously-described, is prepared. The hydrophobic additive may impart hydrophobicity (create a hydrophobic portion) to a cured coating prepared including the hydrophobic additive in the coating composition. The hydrophobic portion is defined as a portion of the coating composition that exhibits a WCA of at least 90° using Kruss Drop Shape Analysis. Suitable hydrophobic additives include fluorinated treated particles, such as a fluorinated treated silica, fluorinated silane treated particles, such as a fluorinated silane treated silica, a hydrophobic treated metal oxide, a rare earth metal oxide, or mixtures thereof.

The hydrophobic additive may be present in the coating composition in an amount of at least 1 weight percent, at least 3 weight percent, at least 5 weight percent, at least 10 weight percent, or at least 15 weight percent based on total solids weight of the coating composition. The hydrophobic additive may be present in the coating composition in an amount less than 30 weight percent, less than 25 weight percent, less than 20 weight percent, or less than 18 weight percent based on total solids weight of the coating composition. The hydrophobic additive may be present in the coating composition in an amount of 3-30 weight percent, 5-25 weight percent, 10-20 weight percent, or 15-20 weight percent, based on total solids weight of the coating composition. An effective amount of the hydrophobic additive may be added to the coating composition such that, when applied to the substrate and cured, the overall coating is hydrophobic. An effective amount of the hydrophobic additive may be added to the coating composition such that, when applied to the substrate and cured, the overall cured coating exhibits a WCA of at least 100°, at least 110°, at least 120°, at least 130°, at least 140°, or at least 150°. An effective amount of the hydrophobic additive may be added to the coating composition such that, when applied to the substrate and cured, the overall cured coating is superhydrophobic. An effective amount of the hydrophobic additive may be added to the coating composition such that, when applied to the substrate and cured, the overall cured coating exhibits a WCA of at least 150° and a hysteresis of no more than 25° or no more than 10°.

The coating composition may further include a coupling agent. The coupling agent may include functional groups such as hydroxyl groups, methoxide groups, or ethoxide groups that are reactive with a substrate such as aluminum to provide or enhance adhesion between the coating composition and the substrate. The coupling agent may include a silane, an alkoxy silane, a fluoroalkylsilane, an aminopropyltriethoxysilane, and/or mixtures thereof. The coupling agent may be an alkoxy silane, such as 3-aminopropyltriethoxysilane. Other coupling agents may be included in the coating composition based on the composition of the substrate and/or the other components included in the coating composition.

The alkoxy silane functional resin may react with itself or a coupling agent to form a crosslinked polymer network. The use of a coupling agent serves to increase the crosslink density of the crosslinked polymer network. The use of a coupling agents, such as an aminopropyltriethoxysilane, may also serve to accelerate the cure response of the coating composition. The crosslinked polymer network may have a crosslink density of 1.5 to 3.5 mmole/cm$^3$ as measured by ASTM F2214-02.

Any of the coating compositions described herein may include additional materials. Suitable additional materials that can be used with the coating compositions of the present invention include: colorants (e.g., pigments and/or dyes), plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, and other customary auxiliaries.

After preparing the coating composition, the coating composition may be applied to a substrate and cured to form a coating. The substrate may be any suitable material. The substrate may be metallic or non-metallic. Metallic substrates may include, but are not limited to, tin, steel (including stainless steel, electrogalvanized steel, cold rolled steel, and hot-dipped galvanized steel, among others), aluminum, aluminum alloys, zinc-aluminum alloys, steel coated with a zinc-aluminum alloy, or aluminum plated steel. The metallic substrates may also further include a metal pretreatment coating or conversion coating. Suitable pretreatment coatings or conversion coatings include, but are not limited to, zinc phosphate, iron phosphate, or chromate-containing pretreatments. Other suitable pretreatment coatings or conversion coatings include, but are not limited to, thin-film pretreatment coatings such as a zirconium or titanium-containing pretreatment. The metal pretreatment coating may also include a sealer, such as a chromate or non-chromate sealer.

Non-metallic substrates may comprise polymeric materials. Suitable polymeric materials for the substrate may include plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylonitrile butadiene styrene (PC/ABS), or polyamide. Other non-metallic substrates may include glass, wood, wood veneer, wood composite, particle board, medium density fiberboard, cement, stone, paper, cardboard, textiles, leather, both synthetic and natural, and the like. Non-metallic substrates may also include a treatment coating that is applied before application of the coating, which increases the adhesion of the coating to the substrate.

The substrate may be a portion of a HVAC system comprising metal, such as aluminum, an aluminum alloy, or stainless steel. The substrate may be a surface of condenser tubes of the HVAC system, such that the condenser tubes are coated with the coating composition, and the coated condenser tubes may condense water onto the surface thereof. Alternatively, the substrate may be glass, such that the glass coated by the coating composition renders the glass self-cleaning or easy-to-clean.

Application of the coating composition to the substrate renders the substrate surface active. Applying the coating composition to the substrate, such as a metal substrate, provides a coated surface of the substrate that is capable of condensing polar fluid (e.g., water) from the surrounding air onto the surface of the coated substrate. Applying the coating composition to the substrate, such as glass, may provide a coated glass surface that is easy-to-clean or self-cleaning.

The coating compositions described herein may be applied by any means known in the art, such as electrocoating, spraying, electrostatic spraying, dipping, rolling, brushing, and the like. The coating composition may be applied to a substrate by spraying, such as by using a syphon-feed spray gun. The coating composition may be spray applied to the substrate at a number of different thicknesses (e.g., using different numbers of passes).

The coating composition, when applied to the substrate and cured to form a coating, may have a hardness value of about 30 N/mm$^2$ at 24 hours and a maximum hardness value of 150 N/mm$^2$ when fully cured, as measured by using a FISCHERSCOPE HM2000, a professional microhardness measurement instrument for the analysis of mechanical and elastic properties of materials by means of nanoindentation. The coating composition may exhibit a hardness value greater than a hardness value of the same coating prepared from a coating composition not including the alkoxy silane functional resin.

The coating composition, when applied to the substrate and cured to form a coating, may render the coated substrate hydrophobic. The coating composition, when applied to the substrate and cured to form a coating, may render the coated substrate hydrophobic, so as to exhibit a WCA of at least 140°. The coating composition, when applied to the substrate and cured to form a coating, may render the coated substrate superhydrophobic. The coating composition, when applied to the substrate and cured to form a coating, may render the coated substrate superhydrophobic, such that it exhibits a WCA of at least 150° and a hysteresis of no more than 25°.

When the coating composition is applied to the substrate and cured to form a coating, the cured coating may include at least one hydrophobic portion including at least a fluorinated portion of the polymer and at least one hydrophilic portion including the hydrophilic additive. The hydrophobic portion may exhibit a WCA of at least 90°, while the hydrophilic portion may exhibit a WCA of less than 90°. It will be appreciated that, while the cured coating may include at least one hydrophobic portion and at least one hydrophilic portion, the overall coating may be hydrophobic, such that the overall cured coating exhibits a WCA that is hydrophobic, as measured by Kruss Drop Shape Analysis.

The coating composition, when applied to a substrate and cured to form a coating, may include a plurality of hydrophobic portions and a plurality of hydrophilic portions. The coating composition may include alternating hydrophobic and hydrophilic portions. Alternating hydrophobic and hydrophilic portions may mean that at least one of the hydrophobic portions is positioned between at least two of the hydrophilic portions not in direct contact with one another and/or at least one of the hydrophilic portions is positioned between at least two of the hydrophobic portions not in direct contact with one another. It will be appreciated that, while the cured coating may include alternating hydrophobic and hydrophilic portions, the overall coating may be hydrophobic, such that the overall cured coating exhibits a WCA that is hydrophobic.

The following examples are presented to exhibit the general principles of the invention. The invention should not be considered as limited to the specific examples presented. All parts and percentages in the examples are by weight unless otherwise indicated.

Example 1

Water Contact Angle for Room Temperature Cured Coating Composition

A coating composition was prepared from the components listed in Table 1.

TABLE 1

| Component | Solution Weight | Solids | Weight % on solids |
|---|---|---|---|
| FMS-9922 Polytrifluoropropyl-methylsiloxane silanol terminated[1] | 8.4 | 8.4 | 21.7% |
| Nano TiO$_2$-P25, Aeroxide[2] | 12.6 | 12.6 | 32.6% |
| 3-Aminopropyltriethoxysilane[3] | 2.0 | 2.0 | 5.2% |
| n-Butyl acetate[4] | 47.8 | 0 | 0.0% |
| Zirconium butoxide[5] | 1.4 | 1.4 | 3.6% |
| Dibutyltin diacetate[6] | 0.25 | 0.25 | 0.6% |
| Alkoxy silane urethane[7] | 24.15 | 14 | 36.2% |
| | 96.60 | 38.65 | 100.0% |

[1]Available from Gelest, Inc. (Morrisville, Pennsylvania)
[2]Particle size of 25 nm. Available from Evonik Industries (Essen, Germany)
[3]Available from Gelest, Inc. (Morrisville, Pennsylvania)
[4]Available from Fisher Scientific (Hampton, New Hampshire)
[5]Available from Sigma Aldrich (St. Louis, Missouri)
[6]Available from Sigma Aldrich (St. Louis, Missouri)
[7]An alkoxy silane functional urethane resin prepared by reacting a polyfunctional isocyanate trimer (52%), 1,4-butanediol (3.8%) and n-butyl-3 aminopropyltrimethoxysilane (44.2%) (solids content).

A total of 8.4 grams of FMS-9922 polytrifluoropropylmethylsiloxane silanol terminated and 47.8 grams of n-butyl acetate were added to a suitable reaction vessel equipped with an air motor containing a cowles dispersing blade first set at a 125 rpm. Nano-sized particles of TiO$_2$—P25 aeroxide (13.04 grams) (from Evonik Industries (Essen, Germany) and having a mean particle size which is 25 nm as reported by the manufacturer) were slowly added to the reaction vessel over a time of 15 minutes. The speed on the air motor was increased to 1600 rpm and the particles were dispersed in the mixture for 30 minutes. The speed of the air motor was set to 125 rpm after the 30 minutes and 2.0 grams of 3-aminopropyltriethoxysilane, 1.4 grams of zirconium butoxide, 0.25 grams of dibutyltin diacetate, and 24.15 grams of an alkoxy silane functional urethane were added to the mixture over 10 minutes and the mixture was allowed to stir for an additional 10 minutes at 125 rpm. This mixture was then spray-applied to pre-treated (using X-Bond 4000 from PPG Industries, Inc. (Pittsburgh, Pa.)) aluminum panels and allowed to cure at ambient temperature for 24 hours. The coating thickness was approximately 0.3 mm. The panels were tested the next day for WCA and hysteresis using the Kruss Drop Shape Analysis using the Kruss Drop Shape Analyzer (DSA 100) according to ASTM test method D7334. The WCA for this coating was 154.5°. The hysteresis demonstrated by the coating was 20.4°. The coating was also tested for hardness using a FISCHERSCOPE HM2000, a professional microhardness measurement instrument for the analysis of mechanical and elastic properties of materials by means of nanoindentation. The microhardness of this coating was measured to be 104.6 N/mm$^2$.

Example 2

Water Contact Angle for Room Temperature Cured Coating Composition without Metal Alkoxide A coating composition was prepared from the components listed in Table 2.

TABLE 2

| Component | Solution Weight | Solids | Weight % on solids |
|---|---|---|---|
| FMS-9922 Polytrifluoropropyl-methylsiloxane silanol terminated[1] | 15.4 | 15.4 | 41.3% |
| Nano TiO$_2$-P25, Aeroxide[2] | 12.6 | 12.6 | 33.8% |
| 3-Aminopropyltriethoxysilane[3] | 2.0 | 2.0 | 5.4% |
| n-Butyl acetate[4] | 53 | 0 | 0.0% |

TABLE 2-continued

| Component | Solution Weight | Solids | Weight % on solids |
|---|---|---|---|
| Dibutyltin diacetate[5] | 0.25 | 0.25 | 0.7% |
| Alkoxy silane urethane[6] | 12.07 | 7 | 18.8% |
| | 95.32 | 37.25 | 100.0% |

[1-6]see Table 1

A total of 15.4 grams of FMS-9922 polytrifluoropropylmethylsiloxane silanol terminated, and 53.0 grams of n-butyl acetate were added to a suitable reaction vessel equipped with an air motor containing a cowles dispersing blade first set at a 125 rpm. Nano-sized particles of $TiO_2$—P25 aeroxide (12.6 grams) and having a mean particle size which is 25 nm according to ASTM F1877-16 were slowly added to the reaction vessel over a time of 15 minutes. The speed on the air motor was increased to 1600 rpm and the particles were dispersed in the mixture for 30 minutes. The speed of the air motor was set to 125 rpm after the 30 minutes and 2.0 grams of 3-aminopropyltriethoxysilane, 0.25 grams of dibutyltin diacetate, and 12.1 grams of an alkoxy silane functional urethane were added to the mixture over 10 minutes and the mixture was allowed to stir for an additional 10 minutes at 125 rpm. This mixture was then spray-applied to pre-treated using X-Bond 4000 aluminum panels and allowed to cure at ambient temperature for 24 hours. The coating thickness was approximately 0.3 mm. The panels were tested the next day for WCA and hysteresis using Kruss Drop Shape Analysis. The WCA for this coating was 158.1°. The hysteresis demonstrated by the coating was 26.2°. The coating was also tested for hardness using a FISCHERSCOPE HM2000, a professional microhardness measurement instrument for the analysis of mechanical and elastic properties of materials by means of nanoindentation. The microhardness of this coating was measured to be 16.1 $N/mm^2$.

Example 3

Water Contact Angle for Room Temperature Cured Coating Composition

A coating composition was prepared from the components listed in Table 3.

TABLE 3

| Component | Solution Weight | Solids | Weight % on solids |
|---|---|---|---|
| FMS-9922 Polytrifluoropropyl-methylsiloxane silanol terminated[1] | 9.8 | 9.8 | 22.8% |
| Nano $TiO_2$-P25, Aeroxide[2] | 12.9 | 12.9 | 30.0% |
| 3-Aminopropyltriethoxysilane[3] | 2.3 | 2.3 | 5.3% |
| n-Butyl acetate[4] | 48.8 | 0.0 | 0.0% |
| Zirconium butoxide[5] | 1.4 | 1.4 | 3.2% |
| Dibutyltin diacetate[6] | 0.26 | 0.26 | 0.6% |
| Acrylic silane[8] | 24.47 | 16.4 | 38.1% |
| | 99.93 | 43.2 | 100.0% |

[8]A silane functional acrylic resin prepared by reacting an acrylic polyol (84%), trimethoxysilyl isocyanate functional silane (16%), and vinyl trimethoxy silane (solids content).

A total of 9.8 grams of FMS-9922 polytrifluoropropylmethylsiloxane silanol terminated, and 48.8 grams of n-butyl acetate were added to a suitable reaction vessel equipped with an air motor containing a cowles dispersing blade first set at a 125 rpm. Nano-sized particles of $TiO_2$—P25 aeroxide (12.9 grams) and having a mean particle size which is 25 nm according to ASTM F1877-16 were slowly added to the reaction vessel over a time of 15 minutes. The speed on the air motor was increased to 1600 rpm and the particles were dispersed in the mixture for 30 minutes. The speed of the air motor was set to 125 rpm after the 30 minutes and 2.3 grams of 3-aminopropyltriethoxysilane, 1.4 grams of zirconium butoxide, 0.26 grams of dibutyltin diacetate, and 24.47 grams of a silane functional acrylic were added to the mixture over 10 minutes and the mixture was allowed to stir for an additional 10 minutes at 125 rpm. This mixture was then spray-applied to pre-treated using X-Bond 4000 aluminum panels and allowed to cure at ambient temperature for 24 hours. The coating thickness was approximately 0.3 mm. The panels were tested the next day for WCA and hysteresis using Kruss Drop Shape Analysis. The WCA for this coating was 154.2°. The hysteresis demonstrated by the coating was 1.8°. Fischer microhardness for the fully cured coating was measured at 92.04 $N/mm^2$.

The present invention further includes the subject matter of the following clauses.

Clause 1: A coating composition comprising a polymer prepared from a mixture of reactants comprising (a) a fluorinated polysiloxane; and (b) an alkoxy silane functional resin, wherein the alkoxy silane functional resin comprises a polyurethane resin or an acrylic resin.

Clause 2: The coating composition of clause 1, wherein the mixture of reactants further comprises (c) a metal alkoxide.

Clause 3: The coating composition of clause 1 or 2, further comprising a hydrophobic additive and/or a hydrophilic additive.

Clause 4: The coating composition of clause 3, wherein the surface active coating composition comprises the hydrophobic additive, wherein the hydrophobic additive comprises a fluorinated treated silica, a fluorinated silane treated silica, a fluorinated silane treated particle, a hydrophobic treated metal oxide, a rare earth metal oxide, or some combination thereof.

Clause 5: The s coating composition of any of the preceding clauses, wherein the fluorinated polysiloxane comprises polytrifluoropropylmethylsiloxane.

Clause 6: The coating composition of any of the preceding clauses, further comprising a coupling agent.

Clause 7: The composition of clause 6, wherein the coupling agent comprises a silane, an alkoxy silane, a fluoroalkylsilane, an aminopropyltriethoxysilane, or some combination thereof.

Clause 8: The coating composition of any of clauses 3-7, wherein the hydrophilic additive and/or the hydrophobic additive comprises at least 1 weight percent of the surface active coating composition based on total solids weight of the surface active coating composition.

Clause 9: The coating composition of any of clauses 2-8, wherein the metal alkoxide comprises at least 0.5 weight percent of the surface active coating composition based on total solids weight of the surface active coating composition.

Clause 10: The coating composition of any of the preceding clauses, wherein, when applied to a substrate and cured to form a coating, the coating is hydrophobic.

Clause 11: The coating composition of any of the preceding clauses, wherein, when applied to a substrate and cured to form a coating, the coated substrate exhibits a water contact angle of at least 140°.

Clause 12: The coating composition of any of clauses 3-11, wherein, when applied to a substrate and cured to form a coating, the coating comprises a hydrophobic portion comprising at least a fluorinated portion of the polymer and a hydrophilic portion comprising the hydrophilic additive.

Clause 13: The coating composition of any of clauses 3-12, wherein the surface active coating composition comprises the hydrophilic additive, wherein the hydrophilic additive comprises nano-sized particles comprising titanium dioxide, aminopropylsilane treated silica particles, untreated silica particles, or some combination thereof.

Clause 14: The coating composition of any of the preceding clauses, wherein the alkoxy silane functional resin comprises at least 4 alkoxy groups bonded to silicon atoms.

Clause 15: The coating composition of clause 14, wherein the alkoxy silane functional resin comprises at least 6 alkoxy groups bonded to silicon atoms.

Clause 16: The coating composition of clause 14 or 15 wherein the alkoxy silane functional resin comprises at least 9 alkoxy groups bonded to silicon atoms.

Clause 17: The coating composition of any of the preceding clauses, wherein when cured, a coating formed from the surface active coating composition exhibits a hardness value greater than a hardness value of the same coating prepared from a coating composition not including the alkoxy silane functional resin.

Clause 18: The coating composition of any of the preceding clauses, wherein the hardness value is less than or equal to 150 N/mm$^2$ when fully cured.

Clause 19: The coating composition of any of the preceding clauses, wherein the crosslink density is between 1.5 and 3.5 mmole/cm$^3$ when cured.

Clause 20: The coating composition of any of the preceding clauses, wherein, when applied to a substrate and cured to form a coating, the coated substrate exhibits a water contact angle of at least 150° and a hysteresis of no more than 25°.

Clause 21: The coating composition of any of the preceding clauses, wherein, when applied to a substrate and cured to form a coating, the coating is superhydrophobic.

Clause 22: The coating composition of any of the preceding clauses, further comprising a cross-linking agent.

Clause 23: The coating of any of clauses 2-22, wherein the metal alkoxide comprises 0.5-10 weight percent of the coating composition based on total solids weight of the coating composition.

Clause 24: The coating of clause 23, wherein the metal alkoxide comprises 0.5-5 weight percent of the coating composition based on total solids weight of the coating composition.

Clause 25: A substrate at least partially coated with the coating composition of any of the preceding clauses.

Clause 26: The substrate of clause 25, wherein the substrate comprises metal or glass.

Clause 27: The substrate of clause 25 or 26, wherein the substrate comprises a surface of a component in a HVAC system.

Clause 28: A method of condensing a polar fluid comprising: contacting the substrate of any of clauses 25-27 with a polar fluid, such that the polar fluid condenses on at least a portion of the coated substrate.

Clause 29: The method of clause 28, wherein the polar fluid comprises water.

Whereas particular embodiments of this invention have been described above for purposes of illustration, it will be evident to those skilled in the art that numerous variations of the details of the present invention may be made without departing from the invention as defined in the appended claims.

The invention claimed is:

1. A single component coating composition comprising a polymer prepared from a mixture of reactants comprising (a) a fluorinated polysiloxane; (b) an alkoxy silane functional resin, wherein the alkoxy silane functional resin comprises a polyurethane resin or an acrylic resin and (c) a metal alkoxide.

2. The single component coating composition of claim 1, further comprising a hydrophobic additive and/or a hydrophilic additive.

3. The single component coating composition of claim 2, wherein the surface active coating composition comprises the hydrophobic additive, wherein the hydrophobic additive comprises a fluorinated treated silica, a fluorinated silane treated particle, a hydrophobic treated metal oxide, a rare earth metal oxide, or a combination thereof.

4. The single component coating composition of claim 1, wherein the fluorinated polysiloxane comprises polytrifluoropropylmethylsiloxane.

5. The single component coating composition of claim 1, further comprising a coupling agent.

6. The single component coating composition of claim 5, wherein the coupling agent comprises a silane, an alkoxy silane, a fluoroalkylsilane, an aminopropyltriethoxysilane, or some combination thereof.

7. The single component coating composition of claim 2, wherein the hydrophilic additive and/or the hydrophobic additive comprises at least 1 weight percent of the coating composition based on total solids weight of the coating composition.

8. The single component coating composition of claim 2, wherein the metal alkoxide comprises at least 0.5 weight percent of the coating composition based on total solids weight of the coating composition.

9. The single component coating composition of claim 1, wherein, when applied to a substrate and cured to form a coating, the coating is hydrophobic.

10. The single component coating composition of claim 1, wherein, when applied to a substrate and cured to form a coating, the coated substrate exhibits a water contact angle of at least 140°.

11. The single component coating composition of claim 2 wherein, when applied to a substrate and cured to form a coating, the coating comprises a hydrophobic portion comprising at least a fluorinated portion of the polymer and a hydrophilic portion comprising the hydrophilic additive.

12. The single component coating composition of claim 2, wherein the coating composition comprises the hydrophilic additive, wherein the hydrophilic additive comprises nano-sized particles comprising titanium dioxide, aminopropylsilane treated silica particles, untreated silica particles, or some combination thereof.

13. The single component coating composition of claim 1, wherein the alkoxy silane functional resin comprises a total of at least 4 alkoxy groups bonded to silicon atoms.

14. The single component coating composition of claim 1, wherein when cured, a coating formed from the coating composition exhibits a hardness value greater than a hardness value of the same coating prepared from a coating composition not including the alkoxy silane functional resin.

15. A substrate at least partially coated with the single component coating composition of claim 1.

16. The substrate of claim 15, wherein the substrate comprises metal or glass.

17. The substrate of claim 15, wherein the substrate comprises a surface of a component in a HVAC system.

18. A method of condensing a polar fluid comprising:
contacting a substrate at least partially coated with a single component coating composition comprising a polymer prepared from a mixture of reactants comprising (a) a fluorinated polysiloxane: (b) an alkoxy silane functional resin, wherein the alkoxy silane functional resin comprises a polyurethane resin or an acrylic resin and (c) a metal alkoxide, with a polar fluid, such that the polar fluid condenses on at least a portion of the coated substrate.

19. The method of claim 18, wherein the polar fluid comprises water.

* * * * *